United States Patent [19]

Lunden

[11] 3,860,128
[45] Jan. 14, 1975

[54] STICKER PLACING APPARATUS FOR LUMBER STACKING MACHINES

[75] Inventor: Sidney L. Lunden, Spokane, Wash.
[73] Assignee: Moore-IEM, Inc., Spokane, Wash.
[22] Filed: Jan. 18, 1974
[21] Appl. No.: 434,368

[52] U.S. Cl............ 214/6 M, 214/6 DK, 214/6 DK
[51] Int. Cl............................................. B65g 57/26
[58] Field of Search......................... 214/6 M, 6 DK

[56] References Cited
UNITED STATES PATENTS

| | | | |
|---|---|---|---|
| 1,490,594 | 4/1924 | De Lateur | 214/6 DK |
| 3,437,215 | 4/1969 | Lunden | 214/6 DK |
| 3,610,443 | 10/1971 | Berge et al. | 214/6 DK |
| 3,703,965 | 11/1972 | Coats | 214/6 M |
| 3,738,510 | 6/1973 | Mason | 214/6 DK |

*Primary Examiner*—Albert J. Makay
*Assistant Examiner*—Leslie J. Paperner
*Attorney, Agent, or Firm*—Wells, St. John & Roberts

[57] ABSTRACT

A sticker placing apparatus is described for use in conjunction with a lumber stacking machine to automatically place stickers between layers of boards in a stack. The apparatus includes sticker supports mounted to the framework of the stacking machine. The sticker supports locate stickers at prescribed pickup stations along the framework. Sticker engaging members are movably mounted to the layer handling means of the stacker and move therewith to engage stickers held by the supports and move them, along with a layer of boards on the layer handling means, forwardly over stationary sticker stripping members, also located on the stacker frame. The layer and stickers are lowered by the handling means to a stacking station forward of the stripping members. The handling means then is retracted to strip the layer of boards and stickers onto the stack. As the layer handling means is retracted, the stickers are moved against the stationary stripping members and are thereby removed from the layer handling means and onto the stack. Actuating and operating means is provide for automatically moving the sticker engaging members clear of the stripping members as the layer handling means is retracted, and for subsequently extending the sticker engaging members prior to operation of the layer handling means to move the next successive layer of boards to the stacking station.

3 Claims, 6 Drawing Figures

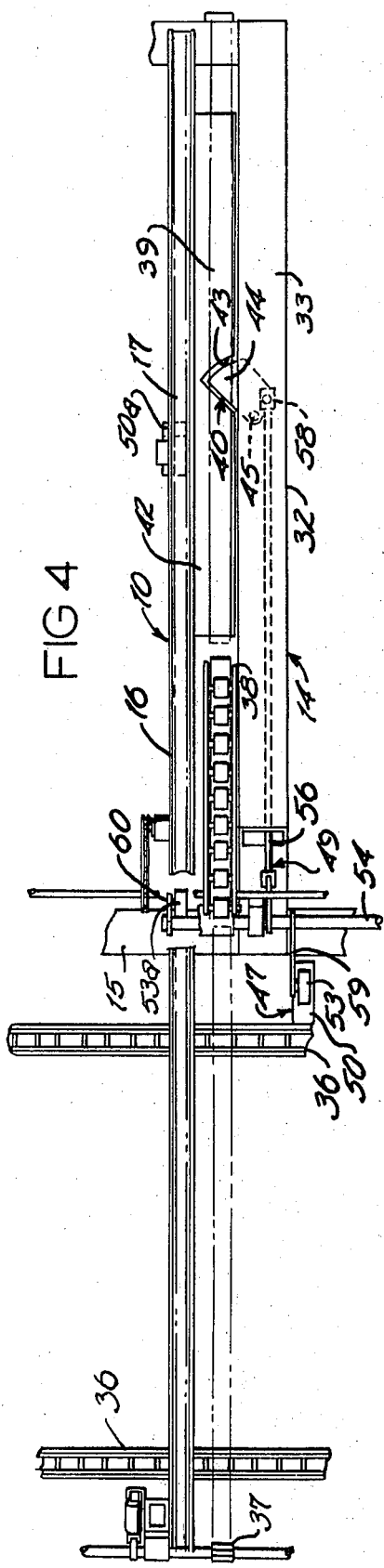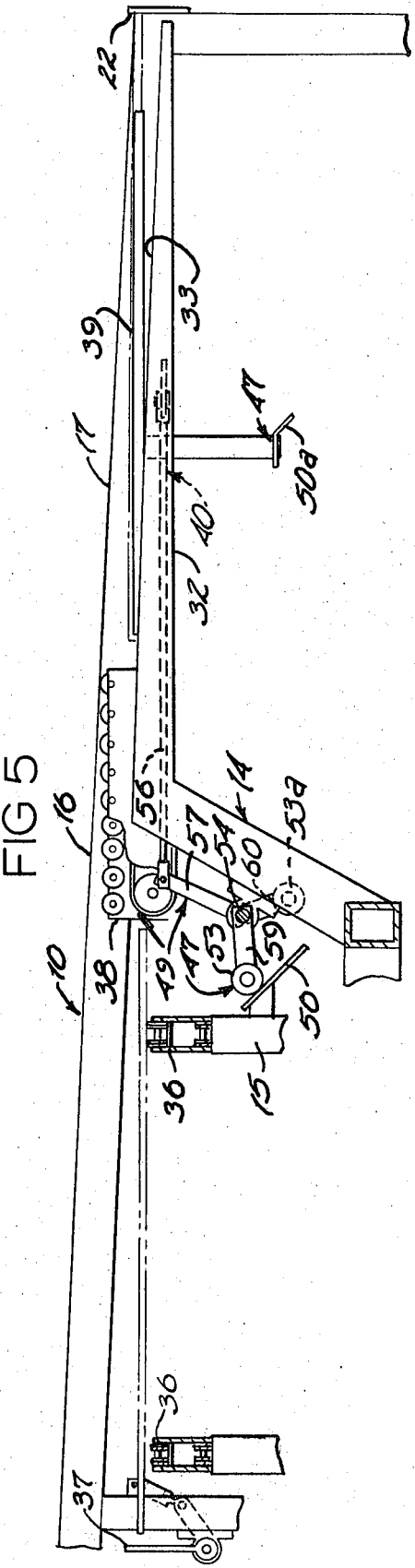

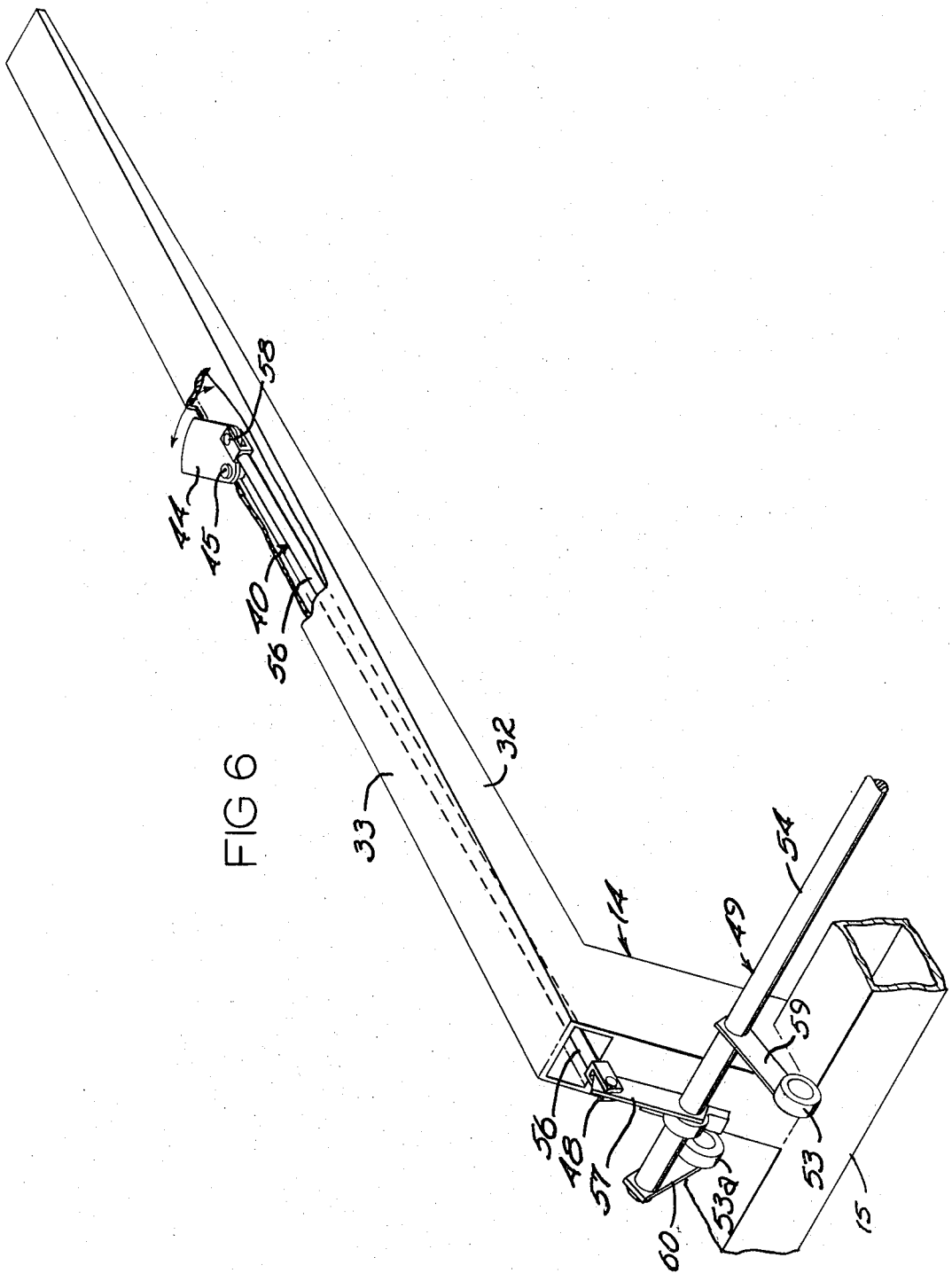

STICKER PLACING APPARATUS FOR LUMBER STACKING MACHINES

BACKGROUND OF THE INVENTION

This invention relates to lumber stacking machines and more particularly to devices for automatically placing stickers between layers of boards during the formation of lumber stacks.

In the lumber industry, boards that have been freshly cut from logs are generally sorted and stacked for drying in a dry kiln. During the stacking operation, stickers, or elongated wooden slats, are placed between layers at spaced intervals. The stickers serve to separate the layers and enable the drying gases in the kiln to circulate through the stack and uniformly dry the boards.

In most stacking operations today, the stickers are manually placed between the layers. Although automatic sticker placing equipment has been developed, the installation and use of such equipment can normally only be justified in the largest of operations. It is also not infrequent that automatic sticker placing equipment has been installed and subsequently removed because of inefficiencies within the equipment.

A sticker placement device for lumber stacking machines is disclosed in my pending application Ser. No. 382,740 filed on July 26, 1973. The apparatus disclosed in this application is concerned primarily with the delivery and distribution of stickers to individual sticker stations so they may be deposited onto a stack along with a layer of boards. Sticker brackets are fixed to stacking arms to engage stickers and lift them against the underside of a layer of boards located above on the stacking machine. The stacking arms are moved forwardly to carry the stickers and a layer of boards over movable stripping members. Once in position above the stack, the arms are lowered in front of the stripping members and subsequently retracted against the stripping members to strip the layer of boards and stickers onto the stack. The rearward path of the fixed brackets however, intersect with the sticker stripping members. To solve this problem, a cam and follower arrangement was devised to move the stripping members to one side of the rearward path of the brackets.

An alternate means for moving the stickers from the sticker stations onto the stack is also disclosed in the above cited pending application. In this form the stripping members are moved by an alternate mechanism comprising a cylinder and crank arm. Thus, when the brackets are retracted along with the layer handling means, the stripping members are pivoted by action of the cylinder and crank arm, out of the path of the retracting bracket.

It is a first object of my invention to provide an improved sticker placing apparatus wherein the bracket or sticker engaging members are movable relative to the layer handling means to enable the stripping members to be rigidly fixed to the lumber stacker framework.

It is a further object to provide such a device that is simplified and includes relatively few moving parts and is therefore substantially maintenance-free.

It is a yet further object of my invention to provide such a sticker placing apparatus that may substantially reduce friction between the stickers, the layer of boards being stripped onto the stack, and the layer handling means as it is retracted to strip the stickers and layers of boards onto the stack.

These and other objects and advantages will become apparent upon reading the following disclosure, which, taken with the accompanying drawings, disclose a preferred form of the present invention.

BRIEF DESCRIPTION OF THE DRAWINGS

A preferred form of the present invention is illustrated in the accompanying drawings in which:

FIG. 4 is a fragmentary plan view of a portion of a lumber stacking apparatus with the present invention mounted thereto;

FIG. 5 is a fragmentary elevational view of the apparatus shown in FIG. 4; and

FIG. 6 is a fragmentary pictorial view illustrating the apparatus of the present invention in relation to a portion of a lumber handling means.

DETAILED DESCRIPTION OF A PREFERRED EMBODIMENT

Figure 1:
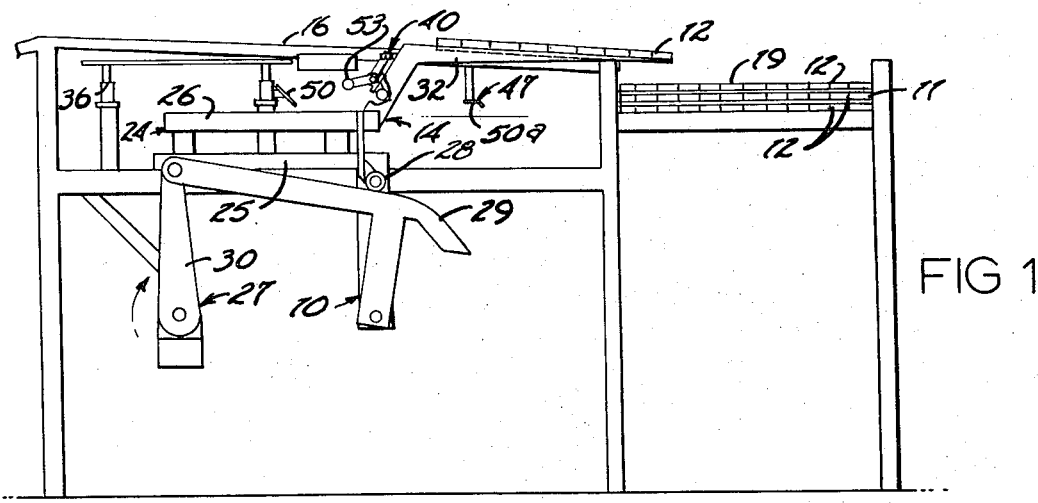
FIG. 1 is a diagrammatic side elevational view of a stacking machine with the present sticker placing apparatus mounted thereon.

Stickers are utilized in the lumber industry for spacing layers of boards apart in a stack. They are generally elongated slats having rectangular cross-sections. The stickers are positioned between the layers of boards during the formation of a lumber stack. Several such stickers are generally placed transversely between layers as the stack is being formed. When utilized as such, the stickers separate the layers and enable the entire stack to be evenly dried in a kiln to prevent or minimize subsequent warping or shrinkage of the individual boards.

A stacking apparatus is illustrated diagrammatically in the drawings and is generally designated by the reference numeral 10. Stacking apparatus 10 is designed to automatically form a stack 11 of a plurality of layers of boards 12. The stacking apparatus principally includes a layer handling means 14 supported by an upright supporting framework 15.

The frame 15 includes a horizontal support table 16 that receives and initially supports the layers of boards at a loading station 17. Layers 12 are moved from loading station 17 to a stacking station 19 on the top of stack 11 by layer handling means 14. Layers of boards are continuously supplied to the stacking machine 10, by a supply means not illustrated in the accompanying drawings.

The layer handling means 14 includes a movable forklift frame carriage 24 comprised of a vertically stationary rolling section 25 and a vertically movable section 26 mounted to the rolling section 25. The carriage 24 is powered by a drive mechanism 27 to move forward and backwardly along the support framework 15, while simultaneously vertically moving the movable section 26 by means of a follower 28 and cam 29. The follower 28 is fixed to rolling section 25 and rides against cam 29 which is connected to a crank arm 30. As the crank arm 30 rotates, the drive mechanism 27 operates the carriage 24 to lift the layers of boards from the support tables at the loading station 17 and move them over the top of stripping members 22 (FIG. 5) to the stacking station 19, then lower the layer in front of members 22 onto the stack. The forklift carriage 24 is then retracted between the stripping members to strip the layers of boards onto the stack.

The layer engaging portion of rolling section 25 is comprised of forwardly extending fork arms 32 that are spaced apart transversely across the stacking machine. The fork arms 32 include layer support surfaces 33 thereon for engaging the bottom surfaces of the layers of boards to lift them from the loading station.

A sticker supply conveyor 36 (FIGS. 4, 5) is utilized to move stickers from a supply source (not shown) to positions spaced across the entire width of stacking apparatus 10. When in preselected positions, the stickers are removed from the supply conveyor 36 by operation of a flipper mechanism 37 adjacent supply conveyor 36. Flippers 37 move the selected stickers forwardly to a secondary conveyor 38. Secondary conveyor 38 is utilized to completely remove the stickers from supply conveyor 36 and move them forwardly to sticker pickup stations 39 located below the layer loading station 19 on the stacking machine.

The apparatus of the present invention is concerned primarily with an improved sticker placing apparatus for moving the stickers from the sticker pickup stations 39 onto the stack. It is for this reason that further description of the mechanisms and elements associated with the stacking machine will not be given in greater detail. Further description of such a stacking machine 10 is discussed in my pending U.S. application Ser. No. 382,740 filed July 26, 1973 incorporated herein by reference.

The improved sticker placing apparatus of the present invention is indicated in the drawings by the reference numeral 40. It is basically comprised of sticker support trays 42 for initially supporting the stickers at the pickup stations 39, movable sticker engaging members 44 mounted to the fork arms 32, stripping members 22 fixed to the frame in the paths of the stickers, and an actuating means 47 for operating the sticker engaging members 44 to move between extended and retracted positions. The sticker engaging members 44 are utilized to engage and move the stickers along forward paths from pickup stations 39 to stacking station 19.

The sticker support trays 42 are located on the support framework 15 in order to receive stickers from the secondary conveyors 38 and for supporting the stickers at the pickup stations 39 below the layers held on the stacker 10 at layer loading stations 17. The sticker support trays 42 each include a transverse recess 43 (FIG. 4) to enable free vertical passage of the sticker engaging members 44 therethrough.

The sticker engaging members 44 are movably held on the fork arms 32 to enable pivotal movement thereof about the axes of fixed pivots 45, between extended positions (illustrated in the drawings) and retracted positions. The extended positions locate the sticker engaging members 44 in the paths of the stickers to that as layer handling means is moved to lift the layers from station 17, the stickers are engaged by members 44 and held thereby for movement with handling means 14 to stacking station 19. The retracted positions locate sticker engaging members 44 within the fork arms 32 so they will clear the stripping members 22 as the layer handling means is retracted.

The sticker engaging members are controlled to move between the extended and retracted positions by an actuator means 47. Actuator means 47 is basically comprised of a spaced pair of cams 50, 50a on framework 15, and corresponding cam followers 53, 53a on handling means 14. An operating means 49 comprised of kinematic chains 48 is connected between the sticker engaging members 44 and actuator means 47 to operate members 44 to move in response to movement of handling means 14.

Kinematic chains 48 include a common shaft 54 extending transversely across the stacker (downwardly with respect to FIG. 4). Shaft 54 is carried by bearings 54a on layer handling means 14 for free rotational movement about its axis. Connecting rods 56 are connected to shaft 54 by means of a crank arm 57. Connecting rods 56 are mounted within the hollow interiors of arms 32 between crank arms 57 and offset pivots 58 on the sticker engaging members 44. Followers 53, 53a are connected to the common shaft 54 by angularly spaced support arms 59 and 60. Arms 59 and 60 position the followers so the shaft 54 is rotated about its axis upon engagement of either follower 53, 53a with a respective cam surface 50, 50a.

The cam surfaces 50 and 50a are located on the supporting framework 15 in the paths of the respective followers 53 and 53a. The rearward cam surface 50 is utilized to engage follower 53 to operate the actuator means to move the sticker engaging members 44 to the extended positions prior to upward movement of the fork arms. The forward cam surface 50a is utilized to engage follower 53a and operate the shaft 54 to rotate and thereby pivot the sticker engaging members about fixed pivots 45 to the retracted positions. This occurs as the layer handling means 14 is retracted to strip the layer onto the stack.

The location of cam surface 50a on framework 15 is rather important since the movement of the sticker engaging members 44 to the retracted position must occur after a number of boards are stripped onto the stack so their weight will hold the stickers substantially in place, and so the sticker engaging members 44 will be retracted before they are drawn past the sticker stripping members 22 that normally lie in the rearward path of the engaging members 44.

Figure 2:
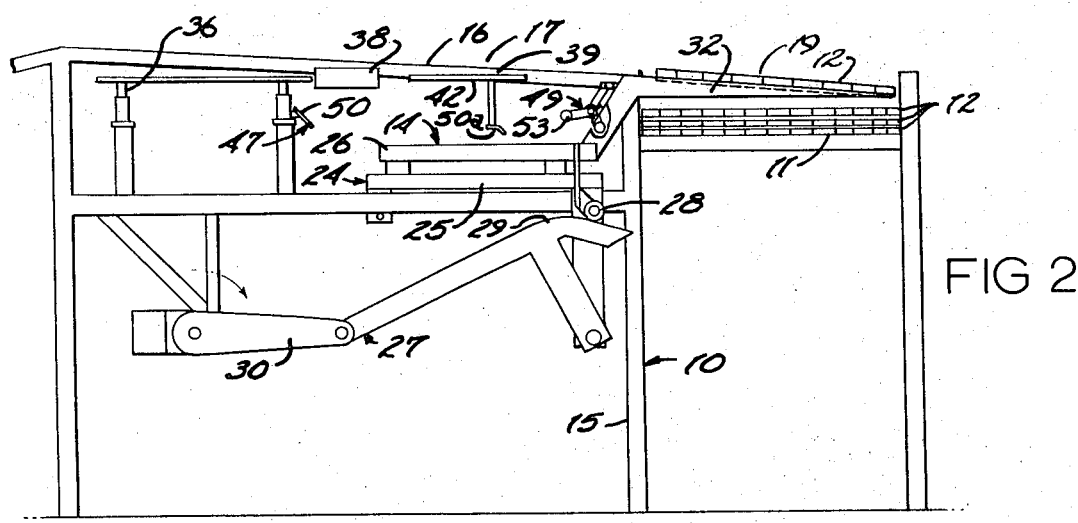
FIG. 2 is a side elevational diagrammatic view similar to FIG. 1 only showing a different operational position of the elements thereof.
Figure 3:
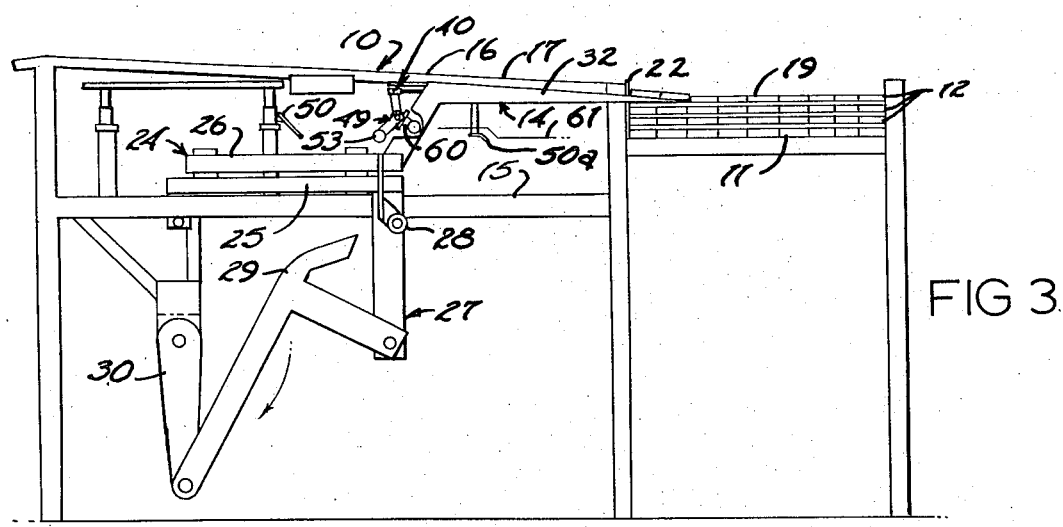
FIG. 3 is an additional diagrammatic view similar to FIGS. 1 and 2 only illustrating a further operational position of the apparatus and associated elements.

The operational cycle is diagrammatically illustrated in FIGS. 1–3 wherein the layer handling apparatus first moves upwardly to engage and lift a layer of boards from the layer loading station. The sticker engaging members 44, having previously been moved to the extended positions by cam surface 50, also engage stickers at the sticker pickup stations and move them along with the layer handling means to positions adjacent the underside of the layer. The layer handling means is then moved forwardly to a position wherein the layer and stickers held thereby are located above the stack (FIG. 2). Once in place above the stack, the fork arms are lowered in front of stripping members 22. The fork arms remain in the lowered position as the layer handling means is retracted to strip the layer onto the stack. The sticker stripping members 22 function at this time to prevent rearward movement of the stickers as the layer handling means is retracted. Cam surface 50a is located longitudinally in the path of the rearwardly moving follower 53a. The resulting path of follower 53a is illustrated by a directional arrow 61 in FIG. 3. As follower 53a engages cam surface 50a, the sticker engaging members 44 are retracted to disengage the stickers and clear the sticker stripping members 22 as the layer handling means continues to retract. At the full retracted position of layer handling means 14, the rearward follower 53 engages the rearward cam surface 50 to move the sticker engaging members 44 back to the extended positions in apprehension of receiving additional stickers during the following operational cycle of the layer handling means.

It may have become evident from the above description and accompanying drawings that various changes and modifications may be made therein without departing from the scope of the invention. It is therefore intended that only the following claims be taken as definitions of my invention.

What I claim is:

1. In a lumber stacking apparatus having a supporting framework for receiving layers of boards at a layer loading station and a layer handling means mounted to the framework for vertical and horizontal movement thereon for lifting successive layers of boards from the loading station, moving the layers forwardly to a stacking station, lowering the layers onto a stack of boards at the stacking station, and subsequently moving rearwardly, stripping the layers onto the stack, an improvement comprising:

a sticker placing apparatus for placing stickers transversely between layers of boards to separate layers of boards within the stack, comprising:

sticker supports mounted to the supporting framework for supporting stickers at prescribed sticker pickup station below the layer loading station;

sticker engaging members mounted to the layer handling means for engaging and moving the stickers against the underside of the layers and along a path from the pickup stations to the stack in response to movement of the layer handling means between the loading station and stacking station;

sticker stripping members located on the framework adjacent the stacking station and in the path of the stickers for stripping the stickers onto the stack as the layer handling means is moved rearward to strip the layers of boards onto the stack;

wherein the sticker engaging members are movable relative to the layer handling means between an extended position wherein the sticker engaging members extend into said path and a retracted position wherein the sticker engaging members clear the sticker stripping members as the layer handling means is retracted; and actuating means operatively connected between the sticker engaging members and the frame for automatically moving the sticker engaging members between the extended and retracted positions in response to movement of the layer handling means.

2. The improvement set out in claim 1 wherein the actuating means includes a cam follower on the layer handling means, and cams positioned on the framework for engaging the cam follower as the layer handling means is moved between the layer loading station and the stacking station.

3. The improvement set out in claim 2 further including operating means comprised of kinematic chains connecting the sticker engaging members to a common operating shaft which in turn mounts the cam follower, whereby the sticker engaging members are moved in unison in response to engagement of the cam follower with the cams.

* * * * *